United States Patent [19]
Ettischer

[11] 3,911,455
[45] Oct. 7, 1975

[54] CAMERA RESET MECHANISM UTILIZING A LENS DIAPHRAGM AS A LIGHT SHIELD
[75] Inventor: Helmut Ettischer, Ruit, Germany
[73] Assignee: Eastman Kodak Company, Rochester, N.Y.
[22] Filed: Aug. 1, 1974
[21] Appl. No.: 493,572

[30] Foreign Application Priority Data
Oct. 12, 1973 Germany.............................. 2351326
Oct. 12, 1973 Germany.............................. 7336874

[52] U.S. Cl. ................ 354/204; 354/229; 354/245; 354/270
[51] Int. Cl.² ...................... G03B 17/42; G03B 9/02
[58] Field of Search ...................... 354/51, 204–206, 354/251, 253, 266–268, 270–274, 228–232, 354/245

[56] References Cited
UNITED STATES PATENTS
2,944,477   7/1960   Tesch................................. 354/274
3,735,676   5/1973   Harvey et al. ........................ 354/51

Primary Examiner—Samuel S. Matthews
Assistant Examiner—James LaBarre
Attorney, Agent, or Firm—D. P. Montheith

[57] ABSTRACT

A photographic camera includes a pair of lens diaphragm blades adjustable for setting the effective size of the camera exposure aperture and an apertured shutter member movable from a cocked position across the aperture to effect an exposure. A shutter reset member positions one of the diaphragm blades into an exposure aperture covering position while urging the shutter member back to its cocked position. This arrangement prevents an undesired film exposure as the shutter is cocked for a subsequent picture-taking operation.

6 Claims, 3 Drawing Figures

CAMERA RESET MECHANISM UTILIZING A LENS DIAPHRAGM AS A LIGHT SHIELD

BACKGROUND OF THE INVENTION

1. Field of the Invention

This invention relates to photographic cameras, and more particularly to apparatus operatively associated with a photographic shutter for preventing a film exposure during preparation for a picture-taking operation.

2. Description of the Prior Art

In photographic cameras which feature a single apertured shutter blade, measures have to be taken to cover the exposure aperture during return movement of the shutter blade, which movement is necessary in order to cock the shutter to prepare for a subsequent exposure.

A shutter of this kind is disclosed in U.S. Pat. No. 3,735,676 issued to D. M. Harvey et al on May 29, 1973 and assigned to the assignee of the instant invention. The apparatus disclosed in the Harvey et al patent provides for a separate cover vane which, when the shutter blade is returned to its cocked position, is pivoted by a shutter cocking member into alignment with the exposure aperture so that the opening in the shutter blade cannot give rise to any undesired exposure as the aperture portion of the blade crosses the exposure aperture. Since the cover vane has to be an additional part which only has one function, relatively high costs are incurred in relation to the usefulness of the part and furthermore extra camera space is required.

SUMMARY OF THE INVENTION

One of the objects of the present invention is to provide an improved light shielding mechanism for shielding light from film during camera preparation for a picture-taking operation.

Another object of the present invention is to provide a light shield utilizing an existing camera element.

A still further object of the invention is to provide a camera of the type having a single, apertured shutter blade and including a lens diaphragm which operates to regulate scene light during shutter exposure movement and to block scene light during shutter cocking movement.

Another object of the instant invention is to provide light shield apparatus which is of simple design and construction and economical to manufacture.

In accordance with the above objects, a photographic camera having an exposure aperture includes an apertured light regulating member movable between a cocked position and a released position for regulating the amount of scene light projected through the exposure aperture onto a film exposure plane. A lens diaphragm is mounted for movement to variably set the effective size of the exposure aperture and an actuatable reset member effects movement of the light regulating member from its released position into its cocked position to set the camera for a subsequent exposure operation. The reset member includes means operatively associated with the lens diaphragm for positioning the diaphragm in an exposure aperture light blocking position as the light regulating member is moved toward its cocked position, to thereby prevent film exposure during cocking movement.

The invention, and its objects and advantages, will become more apparent in the detailed description of a preferred embodiment presented below.

BRIEF DESCRIPTION OF THE DRAWINGS

In the detailed description of the preferred embodiment of the invention presented hereinafter, reference is made to the accompanying drawing, in which.

DESCRIPTION OF A PREFERRED EMBODIMENT

Because photographic cameras are well known, the present description will be directed in particular to elements forming part of, or cooperating more directly with, apparatus in accordance with the present invention. It is to be understood camera elements not specifically shown or described may take various forms well known to those having skill in the art.

Figure 2:
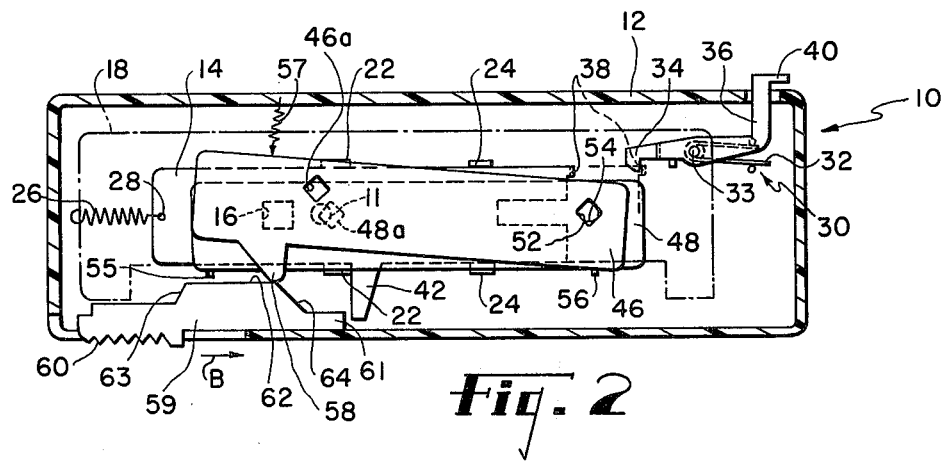
FIG. 2 is a cross-sectional view of a camera, similar to FIG. 1, showing relative positions of the reset member, the diaphragm control blades, and shutter on commencement of a shutter cocking operation.
Figure 3:
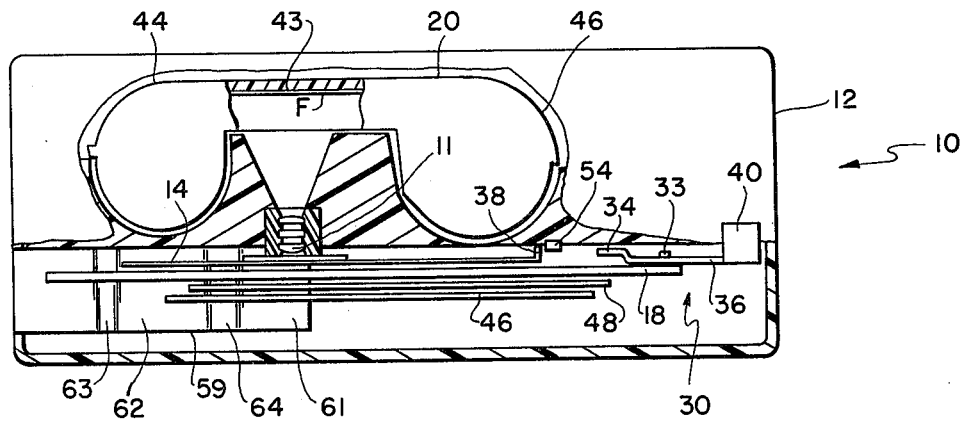
FIG. 3 shows a top elevation view of the camera with a portion of the top of the camera housing removed to illustrate a film cartridge loaded in the camera positioned relative to the diaphragm blades and the shutter.

There is shown in the drawing a camera 10 having an opening or exposure aperture 11 through which light is projected along a path towards a photographic film F shown in FIG. 3, and a housing 12 in which is included a shutter blade 14 having an aperture or opening 16 cut therefrom. As viewed in FIG. 3, shutter blade 14 is disposed between a mounting plate 18 and a received film cartridge 20 and is mounted for slidable movement between spaced guides 22, 24, which are fixedly mounted on the mounting plate, between a shutter released position shown in FIGS. 1 and 2 and a shutter cocked position shown by the partial dashed lines in FIG. 2.

Figure 1:
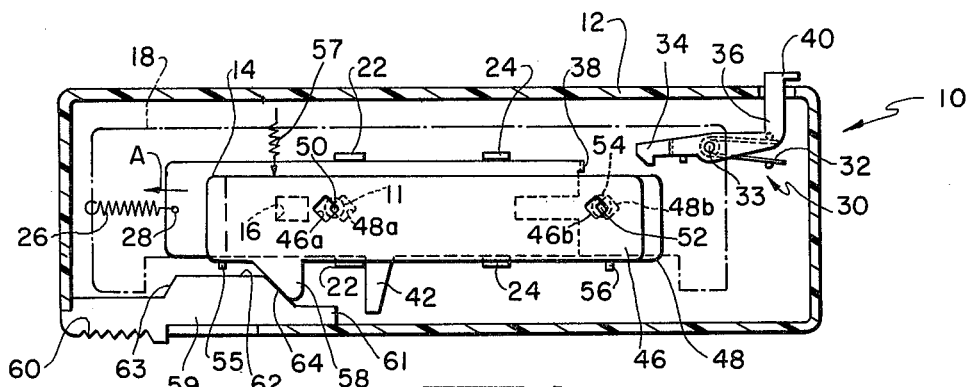
FIG. 1 is a cross-sectional view of a camera showing a pair of movable diaphragm control blades, a shutter blade in its released position, and a camera reset member.

Shutter blade 14 is biased in the direction of arrow A by a tension spring 26, one end of which is hooked to the mounting plate 18 and the other end of which is hooked to the left edge of the shutter blade as viewed in FIGS. 1 and 2 by suitable means such has a post or stud 28 secured thereto. Shutter blade 14 is releasably retained in its cocked position against the bias of spring 26 by releasable engaging means 30 which is biased in the counterclockwise direction as viewed in FIGS. 1 and 2 by means of a tensioned torsion spring 32 wound around a post 33. In its cocked position, a catch member 34 which is integral with one end of L-shape lever 36 engages a tab 38 formed from the top right hand edge of shutter 14 so as to extend perpendicularly therefrom as is most clearly seen in FIG. 3. Mounted on the opposite end of lever 36 external of housing 12 so as to be accessible to a camera operator is a shutter release member 40, actuation of which under operator finger pressure causes lever 36 to pivot in a clockwise direction about post 33 disengaging catch member 34 from tab 38. When this condition occurs, shutter blade 14 moves under the influence of tension spring 26 from its cocked position to its released position wherein a projection or a finger member 42 which depends from the lower edge of the blade in the plane thereof abuttingly engages guide 22. By virtue of its location relative to exposure aperture 11, shutter blade aperture 16 crosses the exposure aperture as the shutter blade runs down in the direction of arrow A to expose film F which is located at a camera film exposure plane 43 between a film supply chamber 44 and a film takeup chamber 46 of cartridge 20.

A pair of opaque diaphragm blades 46, 48 are positioned on the front side of mounting plate 18 as viewed in the drawing for slidable movement relative to each other. Diaphragm blades 46, 48 are respectively provided with diamond-shaped apertures 46a, 46b and 48a, 48b which cooperatively form a lens diaphragm aperture 50 in registry with exposure aperture 11 and a photocell aperture 52 in alignment with photocell 54. Since the amount to which the diaphragm blades can overlap each other is variable, the lens diaphragm aperture and the photocell aperture are variable, both apertures being photoconductively controlled by suitable means such as a linkage mechanism (not shown) coupling the diaphragm blades to each other and responsive to the light intensity level as monitored by the output of photocell 54. Mechanisms of this type are well known in the art and for that reason descriptive details are not included herein.

Diaphragm blades 46, 48 are both mounted for horizontal movement as viewed in FIGS. 1 and 2, diaphragm blade 48, like shutter 14, being mounted for movement between spaced guides 22, 24, and diaphragm blade 46 being in resilient contact with a pair of spaced bearings 55, 56 by bias means such as a light-force spring 57 shown diagrammatically in FIGS. 1 and 2. For a reason made apparent hereinafter this latter arrangement permits diaphragm 46 to be moved pivotally in its own plane with the bearing 56 serving as a pivoting point or fulcrum.

A triangular-shaped projection or cam follower 58 depends from the lower left front edge of diaphragm blade 46 in the plane thereof. Diaphragm blades 46, 48 are moved horizontally over a sufficiently restricted range so that follower 58 does not engage either of bearings 55, 56 so as to interfere or obstruct such movement.

A shutter reset member 59 is mounted for slidable movement along an operational path in the direction of arrow B for rendering camera 10 ready for a picture-taking operation by cocking shutter blade 14. Reset member 59 is disposed beneath and in the plane of both shutter blade 14 and diaphragm blade 46 and includes a knurled button portion 60 at one end thereof located on the exterior of housing 12 so as to be accessible to the camera operator and an elongated finger portion 61 at the other end located so as to abuttingly engage the left edge of finger member 42 to effect shutter cocking movement. The central portion of reset member 59 includes a raised cam portion 62 having inclined end portions or cam surfaces 63, 64, the cam portion being located so that cam surface 64 abuttingly engages follower 58 at the commencement of shutter cocking movement.

The camera shutter is cocked for a picture-taking operation as follows: Starting from an initial position shown in FIG. 1 shutter reset member 59 is actuated under operator control in the direction of arrow B. As this occurs, cam follower 58 rides up cam surface 64, thereby pivoting diaphragm blade 46 in the clockwise direction such that aperture 46a is caused to no longer overlap exposure aperture 11. In this position, shown in FIG. 2, the opaque portion of blade 46 completely overlaps and thereby shields exposure aperture 11 from light. Once exposure aperture 11 is shielded from light, further movement of reset member 59 in the direction of arrow B causes finger member 61 to abuttingly engage projection 42, and to thereby urge shutter blade 14 toward its cocked position. During this cocking movement, shutter blade aperture 16 crosses exposure aperture 11, without however being able to give rise to any film exposure since diaphragm blade 46 due to the influence of cam portion 62 shields the exposure aperture from light. On completion of the shutter cocking movement, catch member 34 snaps into engagement with detent 38 and shutter 14 is releasably retained in its cocked position, wherein the blade is tensioned for returned movement by means of spring 26.

Once shutter blade 14 is cocked, reset member 59 is returned to its initial position in the direction of arrow A. As this occurs, diaphragm blade 46 is returned in the counterclockwise direction under the influence of spring 57 to its light regulating position once cam 62 clears follower 58. When this happens, camera 10 is set for a film exposure operation.

Owning to the advantageous use of diaphragm blade 46 as a light shield during shutter cocking movement, the apparatus constituting the instant invention is rendered economical in respective to cost and internal camera space.

The invention has been described in detail with particular reference to a preferred embodiment thereof but it will be understood that variations and modifications can be effected within the spirit and scope of the invention.

I claim:

1. In a camera having means defining an optical path, said path defining means having an opening through which light is projected toward a film exposure plane, an apertured light regulating member movable in a first direction relative to said optical path for regulating the amount of light projected through said opening onto said film exposure plane, the improvement comprising:
    a. diaphragm means located along said optical path for defining an adjustable diaphragm aperture in registry with said opening, said diaphragm aperture in combination with said opening cooperatively forming an adjustable exposure aperture to control the instantaneous amount of light projected toward said exposure plane; and
    b. a reset member actuatable for effecting return movement of said light regulating member in a direction opposite said first direction to prepare said camera for a film exposure operation, said reset member including means operatively associated with said diaphragm means for effecting movement of at least a portion of said diaphragm means in a direction transverse to said first direction to a position in which said diaphragm means shields said opening from light during at least a portion of said return movement of said light regulating member.

2. In a camera having means defining an optical path, said path defining means having an opening through which light is projected toward a film exposure plane, and a light regulating member mounted for movement relative to said opening from (1) an initial position toward (2) a released position for regulating the amount of scene light projected towards said film exposure plane, the improvement comprising:
    a. diaphragm means located along said optical path, said diaphragm means being adapted for adjustably setting an aperture in alignment with said opening to control the instantaneous amount of light to be projected toward said exposure plane; and b. an actuatable reset member for moving said light regulating member from said released position toward said initial position, said reset member including means coupling said reset member to a portion of said diaphragm means to effect movement of said diaphragm means portion to a position in which said diaphragm means portion shields said opening from light during movement of said light regulating member toward its initial position.

3. A camera as set forth in claim 2 wherein said diaphragm means portion is mounted for movement along a first path to adjustably vary the magnitude of said aperture and for movement along a second path transverse to said first path to shield said opening from light.

4. In a camera having a fixed opening and a shutter member movable from a cocked position across said opening to a released position for regulating the amount of light projected along an optical axis through such an opening onto a film exposure plane, the improvement comprising:

a. a reset member mounted for movement along an operational path to move said shutter member from its released position into its cocked position; and b. first and second spaced diaphragm blades cooperatively coupled for movement relative to each other to adjustably set an aperture in registry with such an opening, said aperture in combination with said opening cooperatively forming an adjustable exposure aperture for said camera, said first blade including means located within said operational path responsive to movement of said reset member therealong for urging said first blade transverse to said operational path into a position in which said first blade overlaps said opening to shield said opening from light during said shutter cocking movement.

5. A camera as set forth in claim 4 wherein said reset member includes means defining a cam member; and said first blade urging means includes a cam follower responsive to said cam member defining means for urging said first blade into said overlapping position.

6. A camera as set forth in claim 5 wherein said reset member further includes a projection member adapted to abuttingly engage said shutter member, said projection member and said cam member defining means being located and arranged relative to each other such that said first blade is moved into said overlapping position prior to commencement of said shutter cocking movement.

* * * * *